(12) United States Patent
Lu et al.

(10) Patent No.: US 8,789,679 B2
(45) Date of Patent: Jul. 29, 2014

(54) TRANSFERRING DEVICE

(71) Applicants: Fu Ding Electronical Technology (Jiashan) Co.,Ltd., Zhejiang (CN); Hon Hai Precision Industry Co., Ltd., New Taipei (TW)

(72) Inventors: Jian-Qiang Lu, Jiashan (CN); Jian-Hua Xu, Jiashan (CN)

(73) Assignees: Fu Ding Electronical Technology (Jiashan) Co., Ltd., Zhejiang (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/934,634

(22) Filed: Jul. 3, 2013

(65) Prior Publication Data

US 2014/0027252 A1 Jan. 30, 2014

(30) Foreign Application Priority Data

Jul. 30, 2012 (CN) .................... 2012 2 03711552 U

(51) Int. Cl.
*B65G 47/28* (2006.01)
*B65G 47/88* (2006.01)
*B65G 47/90* (2006.01)

(52) U.S. Cl.
CPC ............ *B65G 47/8815* (2013.01); *B65G 47/28* (2013.01); *B65G 47/901* (2013.01)
USPC ................. 198/345.3; 198/346.2; 198/463.4; 198/465.3; 198/867.01

(58) Field of Classification Search
CPC ........................... B65G 47/28; B65G 47/8815
USPC .......... 198/345.3, 346.2, 463.4, 465.1, 465.3, 198/867.01
See application file for complete search history.

(56) References Cited

U.S. PATENT DOCUMENTS

| | | | |
|---|---|---|---|
| 6,374,729 B1 * | 4/2002 | Doyle ........................... | 101/114 |
| 8,297,429 B2 * | 10/2012 | Matsuura et al. .......... | 198/345.3 |
| 8,430,229 B2 * | 4/2013 | Abbestam .................. | 198/463.3 |
| 2006/0054459 A1 * | 3/2006 | Farmer et al. .............. | 198/345.3 |
| 2006/0118384 A1 * | 6/2006 | Funakoshi et al. ......... | 198/345.3 |
| 2008/0067035 A1 * | 3/2008 | Keith et al. ................. | 198/345.3 |

* cited by examiner

*Primary Examiner* — Mark A Deuble
(74) *Attorney, Agent, or Firm* — Novak Druce Connolly Bove + Quigg LLP

(57) ABSTRACT

A transferring device includes a conveyer system, a reloading mechanism, and a jig. The reloading mechanism includes a blocking assembly and a grasping assembly. The blocking assembly includes a holding member mounted on the conveyer system, a stopping member, and a first driving member positioned on the holding member. The stopping member is connected to the first driving member. The grasping assembly includes a fixing member mounted on the conveyer system, a second driving member mounted on the fixing member, a third driving member mounted on the second driving member, and a pair of catches. The catches are positioned at opposite ends of the third driving member. The jig includes a top cover and a bottom cover engaged with the top cover. The jig is transferred on the conveyor system.

20 Claims, 5 Drawing Sheets

TRANSFERRING DEVICE

BACKGROUND

1. Technical Field

The present disclosure relates to transferring devices, and particularly, to a transferring device for conveniently reloading workpieces.

2. Description of Related Art

Conveyer belts may be used to automatically transfer workpieces from a previous process to another process. A workpiece may be put into a jig, and the jig carrying the workpiece is put onto the conveyer belt for transferring. However, when the workpiece on the conveyer belt needs to be replaced with another workpiece, the jig carrying the workpiece needs to be manually taken out from the conveyer belt first, and then put onto the conveyer belt again after reloading another workpiece. It is a waste of time for reloading a workpiece via aforementioned processes.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
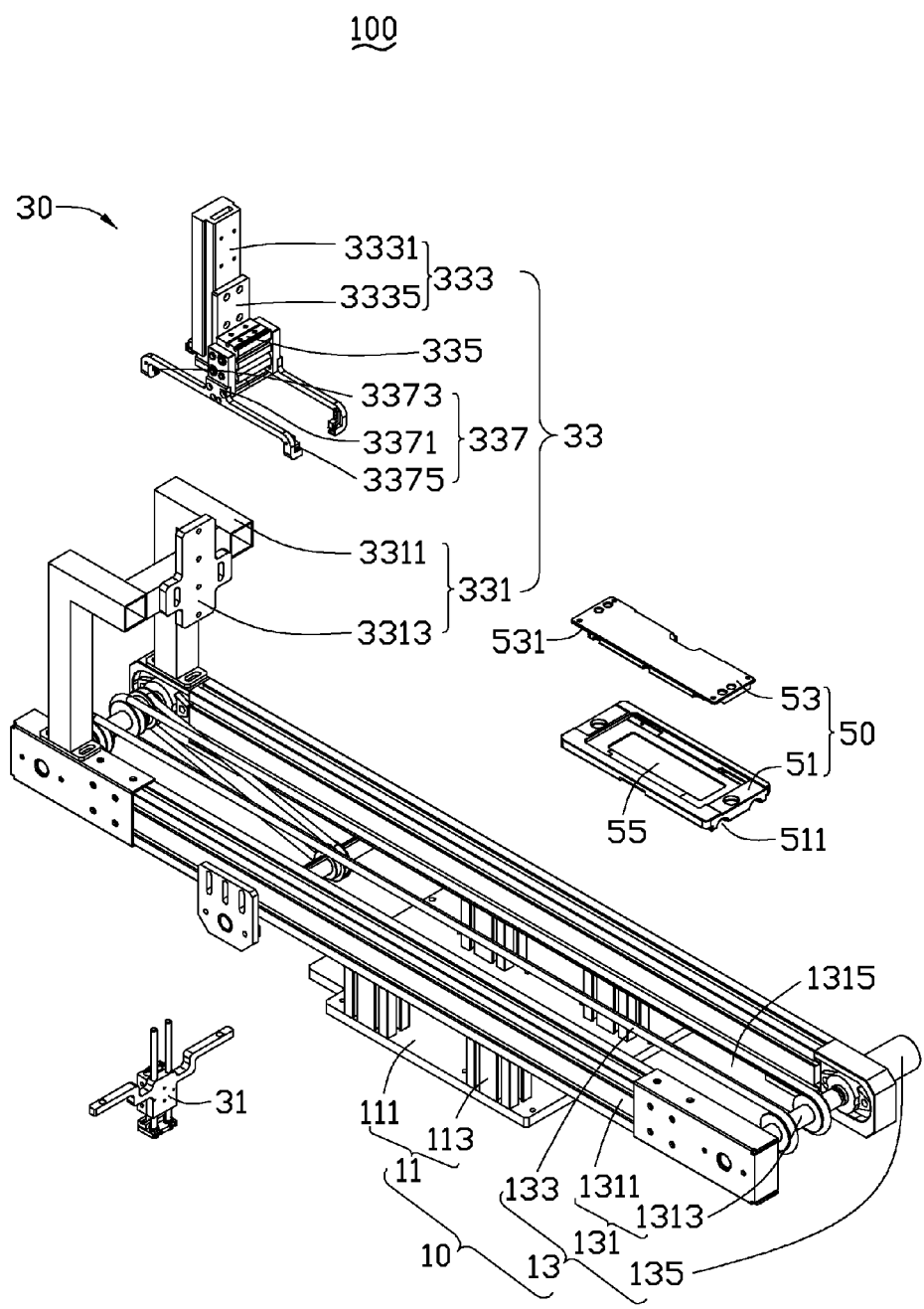
FIG. 1 is an exploded, isometric view of an embodiment of a transferring device including a blocking assembly.

FIG. 1 shows one embodiment of a transferring device 100. The transferring device 100 is configured to transfer one or more workpieces (not shown). The transferring device 100 includes a transferring mechanism 10, a reloading mechanism 30, and a jig 50 for supporting each workpiece.

The transferring mechanism 10 includes a supporting assembly 11 and a conveyor system 13 mounted on the supporting assembly 11. The supporting assembly 11 includes a support plate 111 and a plurality of support posts 113 perpendicularly mounted on the support plate 111. In the illustrated embodiment, there are four support posts 113.

The conveyor system 13 includes a mounting member 131, a conveying member 133 mounted on the mounting member 131, and a driving member 135 connected to the mounting member 131. The mounting member 131 is substantially a frame, and is positioned on the support posts 113. The mounting member 131 includes a pair of positioning portions 1311 and a pair of slave shafts 1313. The positioning portions 1311 are positioned on the support posts 113, and arranged parallel to each other. The slave shafts 1313 are positioned at opposite ends of the positioning portions 1311, and are parallel to each other. Each of the slave shafts 1313 connects an end of one positioning portion 1311 and an adjacent end of the other positioning portion 1311. The slave shafts 1313 are substantially perpendicular to the positioning portions 1311. The positioning portions 1311 and the slave shafts 1313 cooperatively define a receiving chamber 1315. The driving member 135 is connected to one of the slave shafts 1313, and is received in the receiving chamber 1315, for rotating the corresponding slave shaft 1113. In the illustrated embodiment, the driving member 135 is a rotation cylinder.

Opposite ends of the conveying member 133 wind on the slave shafts 1313, and is received in the receiving chamber 1315. The conveying member 133 moves along a direction from one end of the positioning portions 1311 to the other end of the positioning portions 1311 driven by the slave shafts 1313 connected with the driving member 135, for transferring the jig 50 together with the workpiece. The driving member 135 rotates the slave shaft 1313, thereby moving the conveying member 133 from the end of the positioning portions 1311 to the other end of the positioning portions 1311. In the illustrated embodiment, the conveying member 133 includes a pair of belts arranged parallel to each other.

Figure 2:
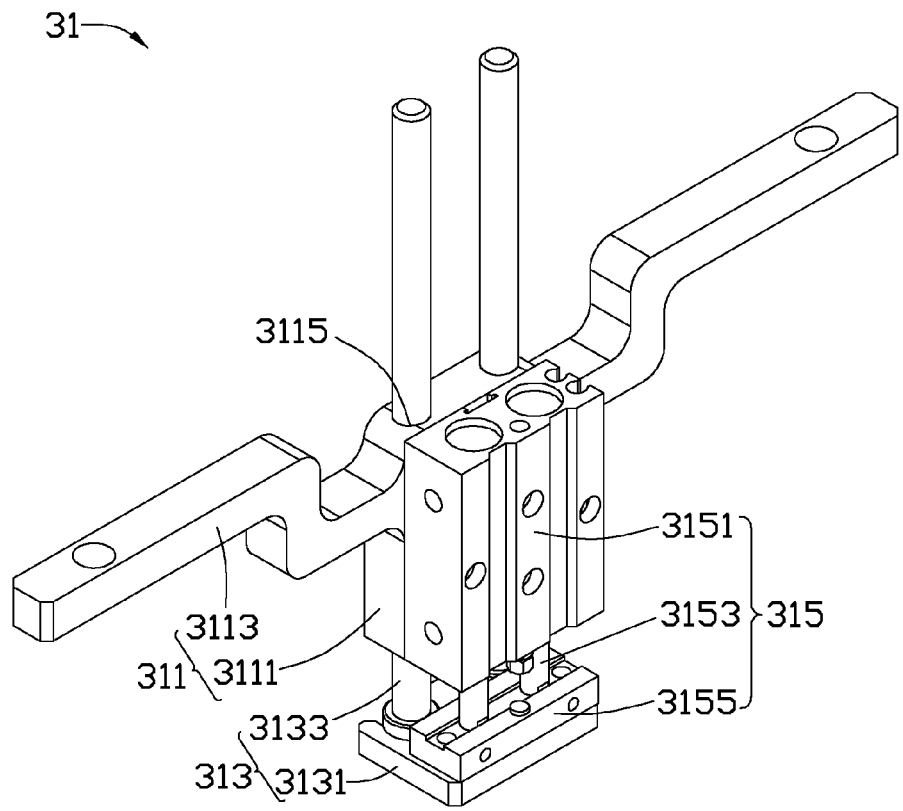
FIG. 2 is an isometric view of the blocking assembly of the transferring device in FIG. 1.

FIG. 2 shows the reloading mechanism 30 which includes a blocking assembly 31 and a grasping assembly 33. The blocking assembly 31 includes a holding member 311, a stopping member 313, and a first driving member 315. The holding member 311 is located below the mounting member 131, and includes a main body 3111 positioned on the mounting member 131 and a pair of positioning ends 3113 extending from the holding member 311. The main body 3111 is substantially rectangular, and defines two through holes 3115 at a top surface thereof adjacent to the positioning portions 1311. The positioning ends 3113 extend outward from opposite sides of the main body 3111, and are positioned on sidewalls of the two positioning portions 1311 adjacent to the support posts 113, respectively. Therefore, the holding member 311 is positioned at a same side of the mounting member 131 with the supporting assembly 11.

The stopping member 313 includes an engaging portion 3131 and a pair of blocking posts 3133 engaging with the engaging portion 3131. The engaging portion 3131 is substantially cubic, and is located at a side of the holding member 311 away from the mounting member 131. The blocking posts 3133 are perpendicularly fixed on the engaging portion 3131. The blocking posts 3133 pass through the through holes 3115 from a side of the main body 3111 away from the positioning portions 1311, and then extend to a position adjacent to the conveying member 133.

The first driving member 315 includes a driving body 3151, a driving rod 3153 and a connecting portion 3155. The driving body 3151 is substantially cubic, and is mounted on the main body 3111. The driving rod 3153 perpendicularly extends from a side of the driving body 3151 away from the mounting member 131. The connecting portion 3155 is substantially cubic, and is formed on a distal end of the driving rod 3153 away from the driving body 3151, and is fixed on the engaging portion 3131. Therefore, the connecting portion 3155 connects the driving rods 3153 and the engaging portion 3131. The driving body 3151 drives the driving rods 3153 and the connecting portion 3155 to stretch along a direction parallel to the blocking posts 3133, and then the connecting portion 3155 drives the blocking posts 3133 to stretch along the through holes 3115 via the engaging portion 3131.

Figure 3:
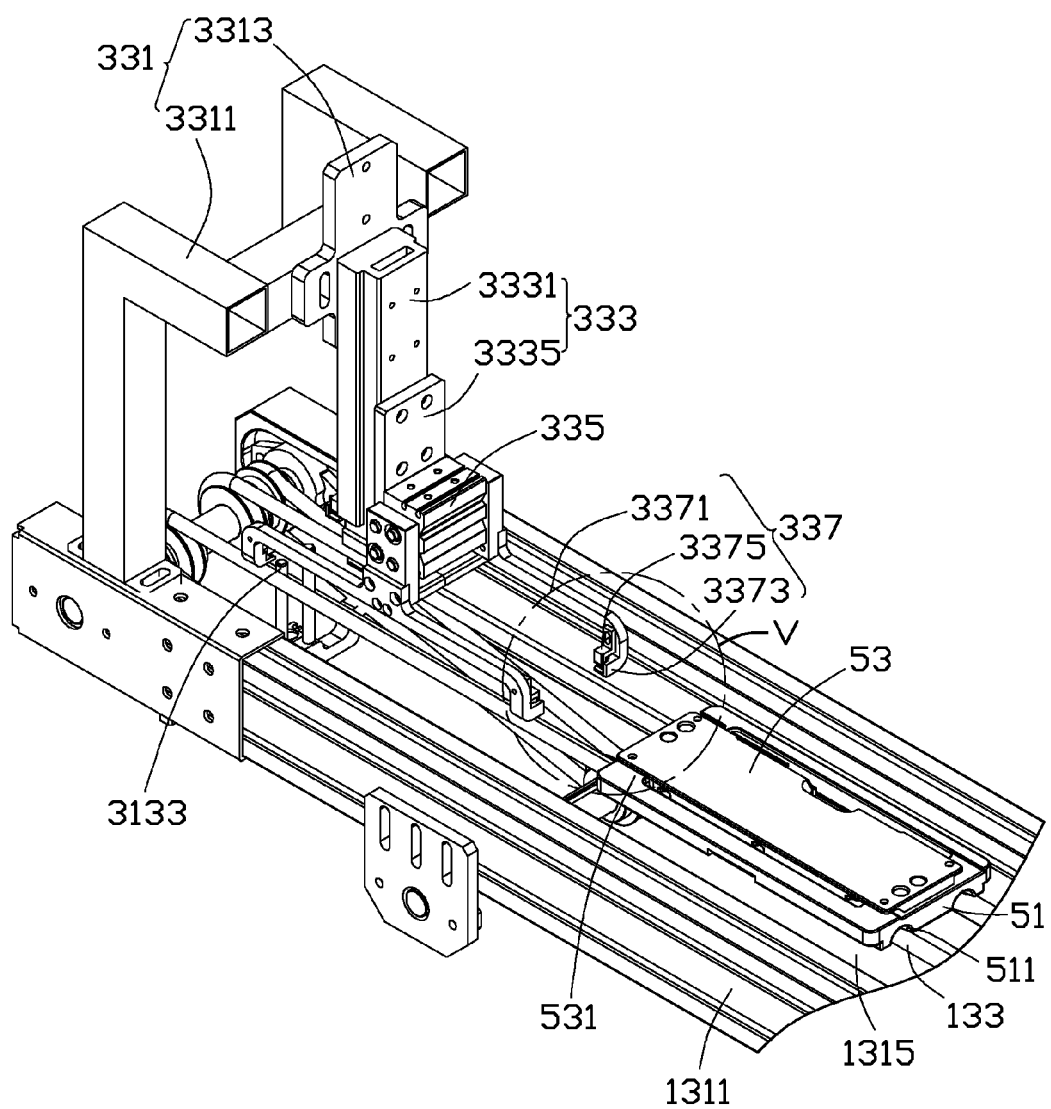
FIG. 3 is a partial, isometric view of the transferring device in FIG. 1 in a first state of use.

FIGS. 1 and 3 show the grasping assembly 33 including a fixing member 331, a second driving member 333, a third driving member 335, and a pair of catches 337. The fixing member 331 includes a mounting frame 3311 and a mounting block 3313 mounted on the mounting frame 3311. The mounting frame 3311 is mounted on the positioning portions 1311, and is located above the positioning portions 1311 and the blocking assembly 31. The mounting block 3313 is mounted on the mounting frame 3311, and is located above the conveying member 133. The second driving member 333 includes a driving body 3331 and a driving portion 3335 mounted on the driving body 3331. The driving body 3331 is mounted on the mounting block 3313, and is perpendicular to the conveying member 133. The driving portion 3335 is slidably mounted on the driving body 3331. The driving body 3331 is capable of driving the driving portion 3335 to slide along the driving body 3331.

Figure 5:
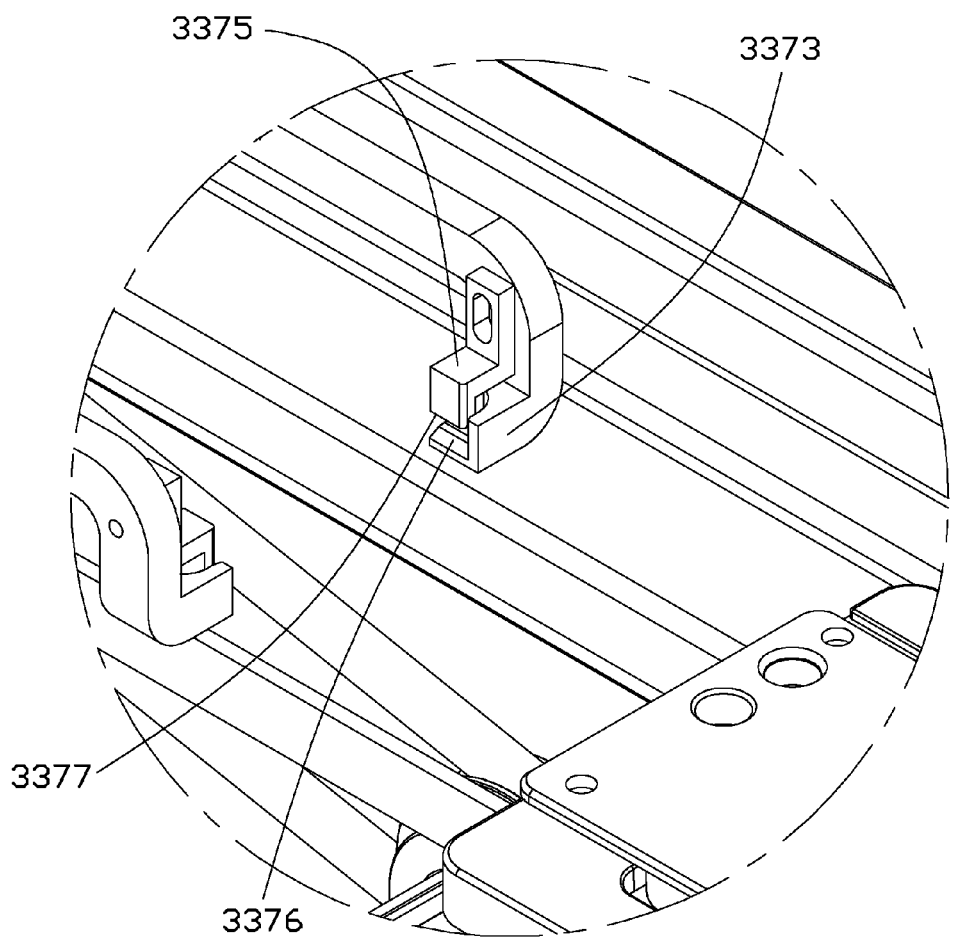
FIG. 5 is an enlarged, isometric view of a circled region V in FIG. 3.

The third driving member 335 is mounted on the driving portion 3335. The driving body 3331 drives the third driving member 335 to move along a direction perpendicular to the conveying member 133 via the driving portion 3335. The pair of catches 337 are mounted on opposite sides of the third driving member 335, respectively. The third driving member 335 drives the pair of catches 337 to clamp or release the workpiece together with the jig 50. The catches 337 include a connecting body 3371, a pair of clamping portions 3373, and a pair of compressing portions 3375. A substantially middle portion of the connecting body 3371 is mounted on the third driving member 335, and the connecting body 3371 is substantially parallel to the positioning portions 1311. The pair of clamping portions 3373 are bent from opposite ends of the connecting body 3371 towards the other catch 337, respectively. The pair of compressing portions 3375 are substantially L-shaped, and are mounted on the clamping portions 3373, respectively. A gap 3376 (shown in FIG. 5) exists between a bottom surface 3377 of each compressing portion 3375 and the corresponding clamping portion 3373, for grasping and positioning the jig 50.

The jig 50 includes a bottom cover 51 and a top cover 53 engaged with the bottom cover 51. The bottom cover 51 and the top cover 53 define a receiving room 55 cooperatively, for receiving and positioning the workpiece. The bottom cover 51 is substantially rectangular, and defines a positioning portion 511 at a sidewall thereof away from the receiving room 55, to enable the jig 50 to be positioned and conveyed on the conveying member 133. The top cover 53 is substantially cubic, and a width of the top cover 53 is substantially equal to a width between the pair of clamping portions 3373. The top cover 53 forms four grasping portions 531 at four corners thereof, respectively. In the illustrated embodiment, the positioning portion 511 is a groove corresponding to the conveying member 133. The grasping portion 531 is a groove engaging with the corresponding clamping portion 3373.

In assembly, first, the mounting member 131 is mounted on the support posts 113, and the conveying member 133 is wound on the slave shafts 1313. Second, the positioning ends 3113 of the blocking assembly 31 is mounted on the positioning portions 1311, and the blocking assembly 31 is located below the positioning portions 1311. Third, the fixing member 331 is mounted on the positioning portions 1311, and the grasping assembly 33 is located above the positioning portions 1311 corresponding to the blocking assembly 31. Finally, the jig 50 is put on the conveying member 133 for conveying workpieces.

Figure 4:
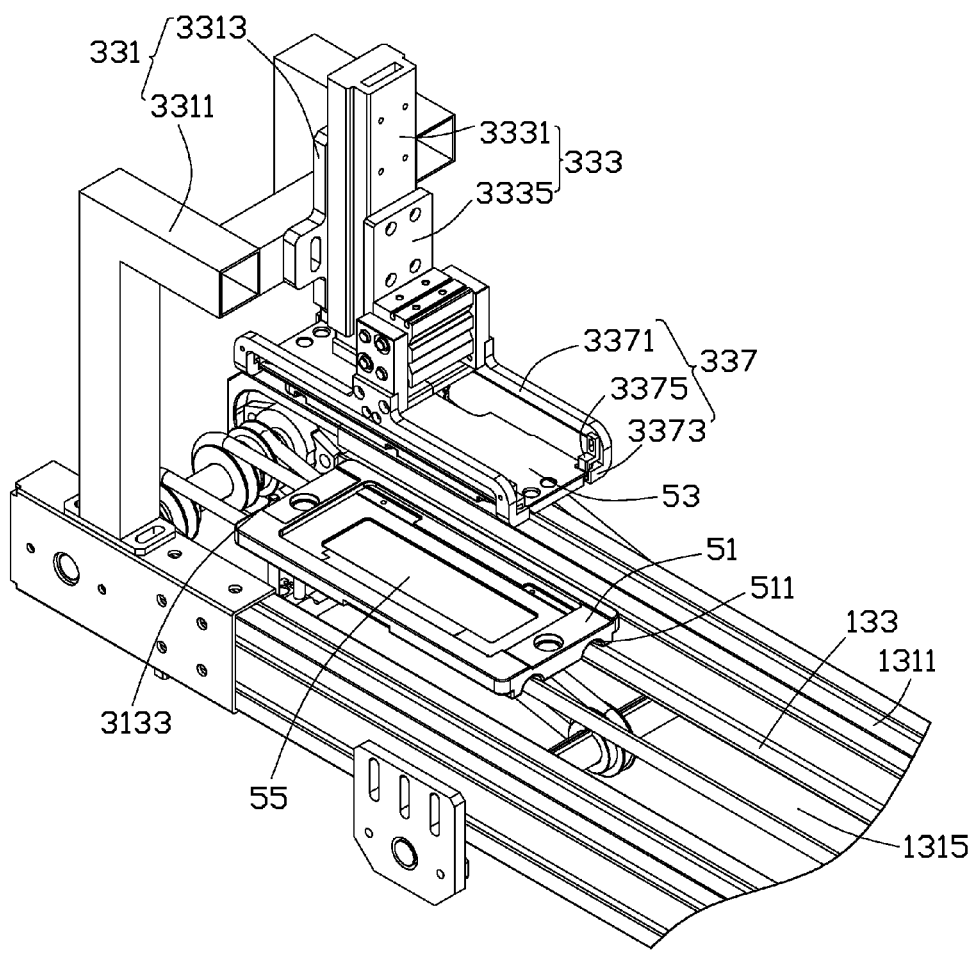
FIG. 4 is a partial isometric view of the transferring device in FIG. 1 in a second state of use.

In use, a workpiece (not shown) is received in the receiving room 55 of the jig 50, and the jig 50 is transferred along the conveying member 133 towards the grasping assembly 33. The transferring device 100 is in a first state of use (shown in FIG. 3). When the jig 50 moves to a position below the catches 337, the driving body 3151 of the first driving member 315 drives the connecting portion 3155 to move towards the driving body 3151, thereby the engaging portion 3131 being driven to move towards the main body 3111 of the holding member 311. The blocking posts 3133 move towards the conveying member 133 along the through hole 3115, thus a distal end of each blocking post 3133 extends across the conveying member 133. The jig 50 is stopped by the blocking posts 3133. The third driving member 335 drives four clamping portions 3373 to grasp the grasping portions 531 of the top cover 53. The second driving member 333 drives the catches 337 and the top cover 53 to move away from the bottom cover 51, for conveniently reloading a new workpiece. The transferring device 100 is in a second state of use (shown in FIG. 4). After reloading a new workpiece manually or automatically, the second driving member 333 drives the catches 337 and the top cover 53 to move towards the bottom cover 51. The catches 337 release the new workpiece driven by the third driving member 335. The driving body 3151 drives the blocking posts 3133 to move away from the conveying member 133, so that the jig 50 is capable of moving along the conveying member 133 again.

In an alternative embodiment, the blocking posts 3133 may be mounted on a side of the positioning portion 1311 opposite to the support posts 113, and the blocking assembly 31 is located above the conveying member 133. The compressing portions 3375 and the grasping portions 531 may be omitted, and the clamping portions 3373 may clamp opposite sidewalls of the top cover 53.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A transferring device, comprising:
a conveyer system;
a jig configured to be transferred on the conveyor system, and comprising a top cover and a bottom cover engaged with the top cover; and
a reloading mechanism comprising a blocking assembly and a grasping assembly, the blocking assembly comprising a holding member, a stopping member, and a first driving member, the holding member mounted on the conveyer system, the first driving member positioned on the holding member, and connected to the stopping member, the first driving member configured to drive the stopping member to stop the jig, the grasping assembly comprising a fixing member, a second driving member, a third driving member, and a pair of catches, the fixing member mounted on the conveyer system, the second driving member mounted on the fixing member, the third driving mounted on the second driving member, the pair of catches positioned at opposite ends of the third driving member, the second driving member configured to drive the pair of catches to move towards or move away from the jig, and the third driving member configured to drive the pair of catches to clamp or release the top cover.

2. The transferring device of claim 1, wherein the conveyor system comprises a mounting member, a conveying member mounted on the mounting member, and a driving member connected to the mounting member, the mounting member comprises a pair of positioning portions and a pair of slave shafts positioned at opposite ends of the pair of positioning portions, the conveying member winds on the pair of slave shafts, the driving member is connected to one of the pair of slave shafts, and the driving member rotates the corresponding one of the pair of slave shafts, to drive the conveying member to move.

3. The transferring device of claim 2, further comprising a supporting assembly, having a support plate and a plurality of support posts perpendicularly mounted on the support plate, the pair of positioning posts positioned on the plurality of support posts.

4. The transferring device of claim 2, wherein the holding member comprises a main body positioned on the mounting member and a pair of positioning ends extending from opposite sides of the holding member, the pair of positioning ends are positioned on the pair of positioning portions, respectively, and the first driving member is mounted on the main body.

5. The transferring device of claim 4, wherein the main body defines at least one through hole, the stopping member comprises an engaging portion and at least one blocking post extending from the engaging portion, the blocking post pass through the at least one through hole, and the first driving member is connected to the engaging portion.

6. The transferring device of claim 5, wherein the first driving member comprises a driving body, a driving rod and a connecting portion, the driving body is mounted on the main body, the driving rod extends from a side of the driving body away from the mounting member, the connecting portion is mounted on a distal end of the driving rod away from the driving body, and connected with the engaging portion.

7. The transferring device of claim 2, wherein the second driving member comprises a driving body and a driving portion, the driving body is mounted on the fixing member, the driving portion is slidably mounted on the driving body, the third driving member is mounted on the driving portion.

8. The transferring device of claim 7, wherein each of the pair of the catches comprises a connecting body and a pair of clamping portions, the connecting body is mounted on the third driving member, each of the pair of clamping portions are bended from opposite ends of the connecting body towards the other one of the pair of the catches.

9. The transferring device of claim 8, wherein each of the pair of the catches further comprises a pair of compressing portions, the pair of compressing portions are mounted on the pair of clamping portions, respectively, a gap exists between a bottom surface of each of the pair of compressing portions and the corresponding one of the pair of clamping portions.

10. The transferring device of claim 7, wherein the fixing member comprises a mounting frame and a mounting block mounted on the mounting frame, the mounting frame is mounted on the pair of positioning portions, the driving body of the second driving member is mounted on the mounting block.

11. A transferring device, comprising:
a conveyer system comprising a mounting member, a conveying member mounted on the mounting member, and a driving member connected to the mounting member, the driving member driving the conveying member to move via the mounting member;
a jig configured to be transferred on the conveyer system, and comprising a top cover and a bottom cover engaged with the top cover; and
a reloading mechanism comprising a blocking assembly and a grasping assembly, the blocking assembly comprising a holding member, a stopping member, and a first driving member, the holding member mounted on the mounting member, the first driving member positioned on the holding member, and connected to the stopping member, the first driving member is configured to drive the stopping member to stop the jig, the grasping assembly comprising a fixing member, a second driving member, a third driving member, and a pair of catches, the fixing member mounted on the mounting member, the second driving member mounted on the fixing member, the third driving mounted on the second driving member, the pair of catches positioned at opposite ends of the third driving member, the second driving member configured to drive the pair of catches to move towards or move away from the bottom cover, and the third driving member is configured to drive the pair of catches to clamp or release the top cover.

12. The transferring device of claim 11, wherein the mounting member comprises a pair of positioning portions and a pair of slave shafts positioned at opposite ends of the pair of positioning portions, the conveying member winds on the pair of slave shafts, the driving member is connected to one of the pair of slave shafts, and the driving member rotates the corresponding one of the pair of slave shafts, to drive the conveying member to move.

13. The transferring device of claim 12, further comprising a supporting assembly having a support plate and a plurality of support posts perpendicularly mounted on the support plate, the pair of positioning posts positioned on the plurality of support posts.

14. The transferring device of claim 12, wherein the holding member comprises a main body positioned on the mounting member and a pair of positioning ends extending from opposite sides of the holding member, the pair of positioning ends are positioned on the pair of positioning portions, respectively, the first driving member is mounted on the main body.

15. The transferring device of claim 14, wherein the main body defines a through hole, the stopping member comprises an engaging portion and a blocking post extending from the engaging portion, the blocking post pass through the through hole, and the first driving member is connected to the engaging portion.

16. The transferring device of claim 15, wherein the first driving member comprises a driving body, a driving rod and a connecting portion, the driving body is mounted on the main body, the driving rod extends from a side of the driving body away from the mounting member, the connecting portion is mounted on a distal end of the driving rod away from the driving body, and connected with the engaging portion.

17. The transferring device of claim 12, wherein the second driving member comprises a driving body and a driving portion, the driving body is mounted on the fixing member, the driving portion is slidably mounted on the driving body, the third driving member is mounted on the driving portion.

18. The transferring device of claim 17, wherein each of the pair of the catches comprises a connecting body and a pair of clamping portions, the connecting body is mounted on the third driving member, each of the pair of clamping portions are bended from opposite ends of the connecting body towards the other one of the pair of the catches.

19. The transferring device of claim 18, wherein each of the pair of the catches further comprises a pair of compressing portions, the pair of compressing portions are mounted on the pair of clamping portions, respectively, a gap exists between a bottom surface of each of the pair of compressing portions and the corresponding one of the pair of clamping portions.

20. The transferring device of claim 17, wherein the fixing member comprises a mounting frame and a mounting block mounted on the mounting frame, the mounting frame is mounted on the pair of positioning portions, the driving body of the second driving member is mounted on the mounting block.

* * * * *